United States Patent [19]

Venzl et al.

[11] Patent Number: 5,153,849

[45] Date of Patent: Oct. 6, 1992

[54] MULTIPLIER HAVING AN OPTIMUM ARRANGEMENT OF ANDING CIRCUITS AND ADDING CIRCUITS

[75] Inventors: Gerd Venzl, Munich; Rebecca Mitchell, Leiderdorp; Ulrich Nerz, Munich; Holger Soukup, Munich; Wolfram Roth, Munich; Bernd Becker, Dudweiler, all of Fed. Rep. of Germany

[73] Assignee: Siemens Aktiengesellschaft, Munich, Fed. Rep. of Germany

[21] Appl. No.: 634,230

[22] PCT Filed: Jul. 6, 1989

[86] PCT No.: PCT/DE89/00445

§ 371 Date: Jan. 18, 1991

§ 102(e) Date: Jan. 18, 1991

[87] PCT Pub. No.: WO90/00773

PCT Pub. Date: Jan. 25, 1990

[30] Foreign Application Priority Data

Jul. 13, 1988 [DE] Fed. Rep. of Germany ....... 3823722

[51] Int. Cl.[5] .................................................. G06F 7/52
[52] U.S. Cl. ..................................................... 364/754
[58] Field of Search .......................... 364/754, 757-760

[56] References Cited

U.S. PATENT DOCUMENTS

| | | | |
|---|---|---|---|
| 4,130,878 | 12/1978 | Balph et al. | 364/758 |
| 4,545,028 | 10/1985 | Ware | 364/760 |
| 4,556,948 | 12/1985 | Mercy | 364/757 |
| 4,598,382 | 7/1986 | Sato | 364/757 |
| 4,752,905 | 6/1988 | Nakagawa et al. | 364/760 |
| 4,839,848 | 6/1989 | Peterson et al. | 364/757 |
| 4,879,677 | 11/1989 | Shiraishi | 364/760 |
| 4,918,639 | 4/1990 | Schwarz et al. | 364/757 |

FOREIGN PATENT DOCUMENTS

0113391A3 7/1984 European Pat. Off. ............ 364/757

OTHER PUBLICATIONS

"Design for a Full Multiplier" by K. J. Dea et al, Proceedings of the Institution of Electrical Engineers, Band 115, No. 11, Nov. 1968 pp. 1592-1594.

"Balanced Delay Trees & Combinatorial Division in VLSI" by Dan Zuras et al, IEEE/Journal of Solid State Circuits, SC-21, Oct. 1986, No. 5, New York, NY pp. 814-819.

*Primary Examiner*—Long T. Nguyen
*Attorney, Agent, or Firm*—Hill, Van Santen, Steadman & Simpson

[57] ABSTRACT

A multiplier in which m−1 place multiplicands can be operated with the multiplier with n−1 place multiplier factors that are represented as binary numbers. In order to achieve a regularly constructed and easily testable arrangement of the multiplier on a chip, one cell (SL) is provided per product place. This cell is composed of AND circuits (UD) for the formation of the partial products allocated to this product place and of adder circuits (AD) for summing up the partial products for this product place. The number of AND circuits and of adder circuits is identical for all cells (SL). Those AND circuits that are not required per product place for generating partial products are applied to 0. Since the individual cells are identically constructed, they can be easily produced from basic circuits and can be easily arranged side-by-side. When a multiplier for multiplicands and multiplier factors having greater width is then to be produced, a further attachment of such cells is merely required.

12 Claims, 11 Drawing Sheets

FIG 2

| | $A_6=\bar{A_3}$ | $A_5=\bar{A_3}$ | $A_4=\bar{A_3}$ | $A_3$ | $A_2$ | $A_1$ | $A_0$ | |
|---|---|---|---|---|---|---|---|---|
| | $A_3B_0$ | $A_3B_0$ | $A_3B_0$ | $A_3B_0$ | $A_2B_0$ | $A_1B_0$ | $A_0B_0$ | $B_0$ |
| II | $A_3B_1$ | $A_3B_1$ | $\overline{A_3B_1}$ | $A_2B_1$ | $A_1B_1$ | $A_0B_1$ | | $B_1$ |
| | $A_2B_2$ | $\overline{A_3B_2}$ | $A_2B_2$ | $A_1B_2$ | $A_0B_2$ | | I | $B_2$ |
| | $\bar{A_3}B_3$ | $\bar{A_2}B_3$ | $\bar{A_1}B_3$ | $\bar{A_0}B_3$ | | | | $B_3$ |
| | | III | | $B_3$ | | | | |
| $P_7$ | $P_6$ | $P_5$ | $P_4$ | $P_3$ | $P_2$ | $P_1$ | $P_0$ | |

FIG 3 m=4, n=4

| $A_7=\bar{A_3}$ | $A_6=\bar{A_3}$ | $A_5=\bar{A_3}$ | $A_4=\bar{A_3}$ | $A_3$ | $A_2$ | $A_1$ | $A_0$ | |
|---|---|---|---|---|---|---|---|---|
| $A_3B_0$ | $A_3B_0$ | $A_3B_0$ | $A_3B_0$ | $A_3B_0$ | $A_2B_0$ | $A_1B_0$ | $A_0B_0$ | $B_0$ |
| $A_3B_1$ | $A_3B_1$ | $A_3B_1$ | $A_3B_1$ | $A_2B_1$ | $A_1B_1$ | $A_0B_1$ | $A_0$ | $B_1$ |
| $A_3B_2$ | $A_3B_2$ | $A_3B_2$ | $A_2B_2$ | $A_1B_2$ | $A_0B_2$ | 0 | 0 | $B_2$ |
| $A_3B_3$ | $A_3B_3$ | $A_2B_3$ | $A_1B_3$ | $A_0B_3$ | 0 | 0 | 0 | $B_3$ |
| $A_3B_3$ | $A_2B_3$ | $A_1B_3$ | $A_0B_3$ | 0 | 0 | 0 | 0 | $B_4=B_3$ |
| $A_2B_3$ | $A_1B_3$ | $A_0B_3$ | 0 | 0 | 0 | 0 | 0 | $B_5=B_3$ |
| $\bar{A_1}B_3$ | $\bar{A_0}B_3$ | 0 | 0 | 0 | 0 | 0 | 0 | $B_6=B_3$ |
| 0 | $B_6$ | 0 | 0 | 0 | 0 | 0 | 0 | $B_7=0$ |
| $P_7$ | $P_6$ | $P_5$ | $P_4$ | $P_3$ | $P_2$ | $P_1$ | $P_0$ | |

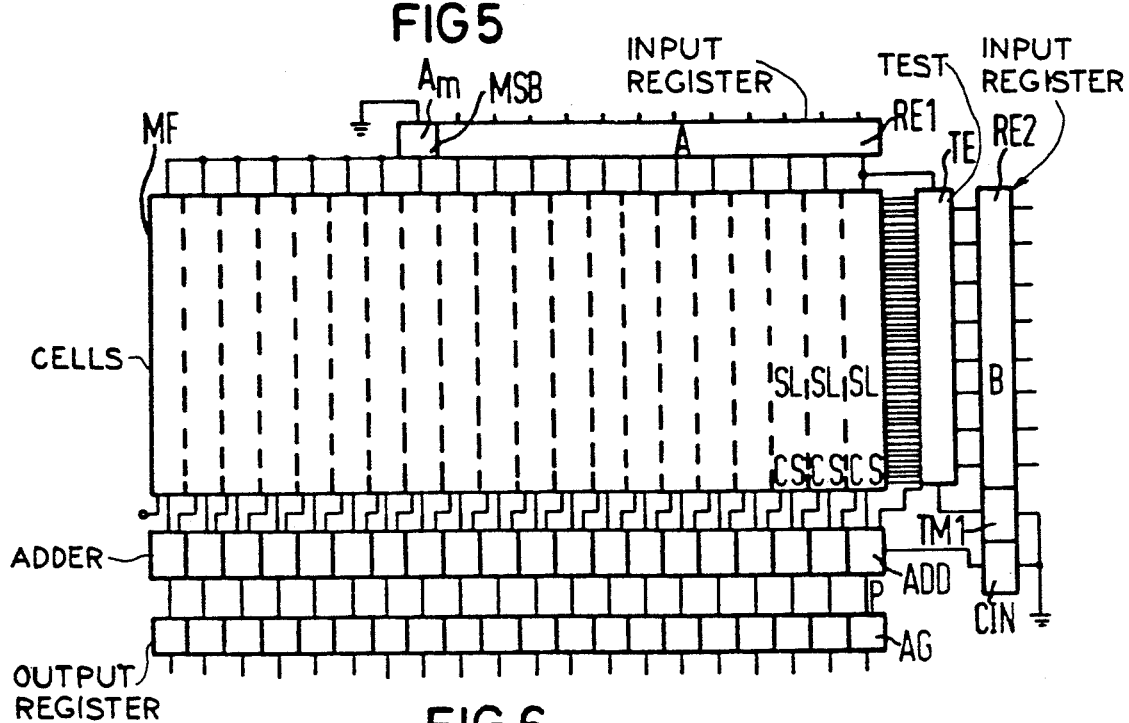
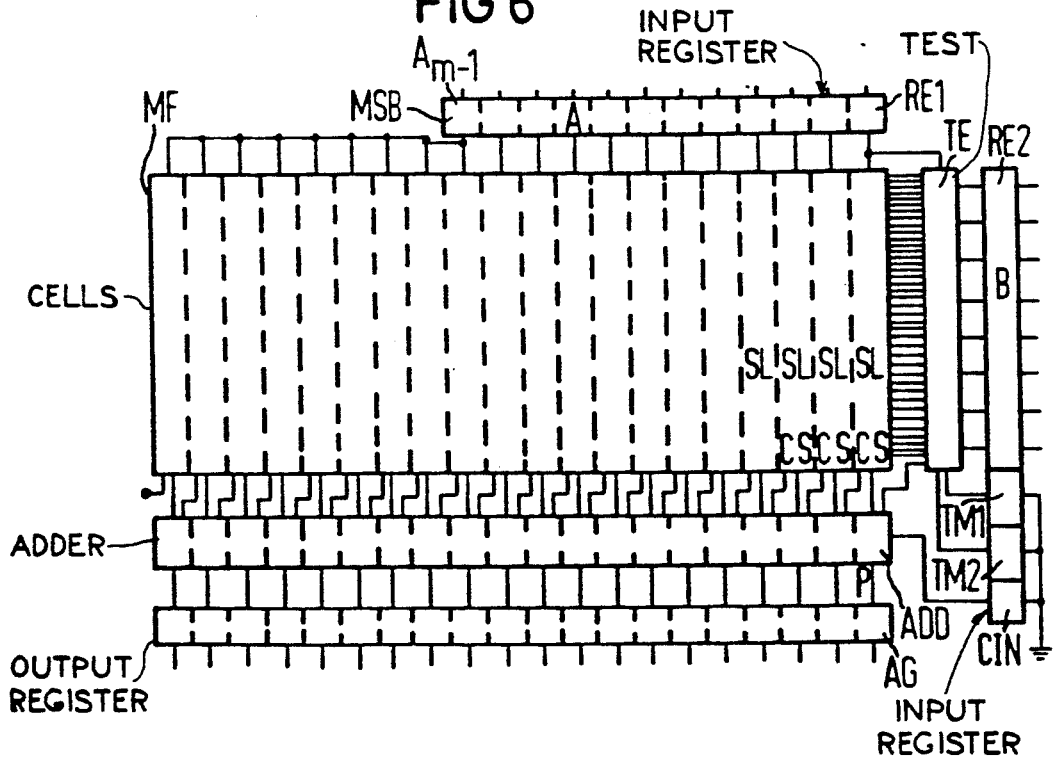

MULTIPLIER HAVING AN OPTIMUM ARRANGEMENT OF ANDING CIRCUITS AND ADDING CIRCUITS

BACKGROUND OF THE INVENTION

The multiplication of x-place multiplicands (x=0, 1, 2...m−1) by a y-place multiplier factor (y=0, 1, 2...n−1) (m and n are whole, positive numbers) that are represented as binary numbers can be implemented according to FIG. 1. This shows a matrix MA that contains the partial products PP that arise in the multiplication. The multiplicand is thereby referenced A and the multiplier factor is referenced B. The partial products can be generated from the multiplier factor place and the multiplicand place with AND circuits. A product place P is generated by summing up the partial products per column of the matrix. A carry from the next, less significant place of the product is thereby also to be taken into consideration. Three fields can be distinguished in FIG. 1. Field III recites the partial products that are necessary for the multiplication. Field I recites partial products that are not necessary in the multiplication; the same is also true of Field II. The places of the matrix are recited with 0 in these Fields I and II.

AND circuits that form the partial products and adder circuits that sum up the partial products per column are thus required in order to construct a multiplier that multiplies according to the matrix of FIG. 1. When such a multiplier is to be realized, it is necessary that the AND circuits and the adder circuits are arranged in an especially advantageous way in order to create a realization on one chip with optimally low space requirement and optimally favorable transit time conditions. It is also necessary that such a multiplier can be very easily tested.

SUMMARY OF THE INVENTION

The object underlying the invention is comprised in specifying a multiplier that is constructed such that it satisfies the above-recited demands. In addition, the structure should be such that a multiplier having variable multiplicand word width and multiplier factor word width can be easily manufactured.

For achieving this object, the multiplier for operating a m-place multiplicand and an n-place multiplier factor both of which are represented as binary numbers comprises a) m+n cells arranged side-by-side, respectively one per product place, whereof each cell respectively contains AND circuits for forming the partial products allocated to the product place and adder circuits for summing up the partial products for this product place, b) the following relationship of the AND circuits and adder circuits within a cell:

each AND circuit is composed of at least two AND elements, whereof each operates one bit of the multiplicand and one bit of the multiplier factor to form a partial product, an adder circuit of the first stage operates the respective partial products generated by an AND circuit to form a partial sum and a partial carry, adder circuits of the second stage operate respectively at least two partial sums of the first stage of the same product place and at least two partial carries of the first stage of the next-less significant product place to form a further partial sum and a further partial carry, adder circuits of the third stage operate respectively at least two partial sums of the second stage of the same product place and at least two partial carries of the second stage of the next-less significant product place to form a further partial sum and a further partial carry, the operation procedure is repeated with the assistance of the adder circuits utilized tree-like in the individual stages until the plurality of partial sums and of partial carries from the next-less significant product place generated in a stage of the same product place is such that it can be operated with a final adder circuit to form a final sum bit and a final carry bit, the final sum bit of a product place and the final carry bit of the preceding product place are operated in an adder circuit to form a value P of the corresponding product place, and c) the following arrangement of the AND circuits and adder circuits within a cell:

a first AND circuit is followed by an adder circuit of the first stage, this adder circuit of the first stage is followed by a second AND circuit to which an adder circuit of the first stage for the output signals of this AND circuit adjoins, the adder circuit of the first stage is followed by an adder circuit of the second stage for the preceding adder circuits of the first stage, this sequence is repeated until two adder circuits of the second stage have appeared, the last adder circuit of the second stage is then followed by an adder circuit of the third stage that operates the output signals of the adder circuits of the second stage, this succession is continued in accord with the preceding steps until the final adder circuit has appeared.

It is especially beneficial for the realization on a semiconductor module and for the testability of the module when the multiplier is regularly constructed. All cells of the multiplier should therefore comprise an identical plurality of AND circuits and an identical plurality of adder circuits. What this means is that an AND circuit is also provided for the partial products lying in Field I and Field II, this AND circuit then generating the partial product 0. To that end, the multiplicand input of the AND circuits can be set to 0. This is valid for that case wherein the multiplicand and the multiplier factor are without operational sign.

When, by contrast, binary numbers having operational sign are to be multiplied, then it is advantageous to select the two's complement representation of these binary numbers. In this case, one input of the AND circuits that generate the partial products lying in Field II are connected to the most significant bit (MSB) of the multiplicand that contains the operational sign. These multiplicand places are also supplied inverted to the AND circuits that operate the most significant bit of the multiplier factor with multiplicand places. Finally, the most significant bit of the multiplier factor must also be added in the $n-1^{th}$ product place.

The arrangement of the AND circuits and of the adder circuits in a cell is expediently selected such that the connecting lines are optimally short. It is thereby expedient that every AND circuit is composed of four AND elements, whereof each operates one multiplicand bit with one multiplier factor bit. Such an AND circuit is followed in the cell by an adder circuit of the first stage. This is followed by a second AND circuit that is in turn followed by an adder circuit of the first stage. The adder circuits of the first stage operate the partial products of the AND circuits. The adder circuit of the first stage is then followed by an adder circuit of the second stage that sums up the results of the two, preceding adder stages of the first stage. The further units of the cell follow on another in a corresponding arrangement, i.e. a further adder circuit of the next-higher stage is utilized when the results of two adder circuits of less-significant stages are to be summed up.

It is advantageous for the test mode that the plurality of multiplicand bits is doubled and the partial products (Field II) that thereby additional arise are formed from the MSB of the multiplicand and of the multiplier factor bits; that, further, the plurality of multiplier factor bits is always expanded by a number divisible by four, whereby the most significant bit of the expansion in the operating case 0 is variable in the test case, the less significant bits of the expansion in the operating case equal to the MSB of the multiplier factor are individually adjustable in the test case. It becomes possible in this way to individually test all AND circuits.

Further developments of the present invention are as follows.

Given an uneven plurality of adder circuits within a stage, an adder circuit of this stage and an adder circuit of another stage are connected to the adder inputs of an adder circuit of a higher stage. Every adder circuit is composed of two full adders following one another each of which has respectively three inputs. Also, every AND circuit is composed of four AND elements whereof each operates on one multiplicand bit and one multiplier factor bit.

An adder circuit is connected in the following way: three partial products are received at the three inputs of the first full adder; the fourth partial product is received at an input of the second full adder, the sum bit of the first full adder is received at the second input, a carry bit from the first full adder of the adder circuit of the first stage allocated to the next-less significant product place is received at the third input. An adder circuit of a more significant stage is connected in the following way: the sum bit from an adder circuit of a less significant stage is received at the first input of the first full adder, a respective carry bit from the carry output of the adder circuits of the lower stage allocated to the next-less significant product place is received at the second and third inputs; the sum bit of an adder circuit of the less-significant stage is received at the first input of the second full adder, the sum bit from the first full adder of the same stage is received at the second input and a carry bit from the first full adder of the adder circuit of the same stage allocated to the next-less significant product place is received at the third input.

All cells have an identical plurality of AND circuits and an identical plurality of adder circuits. The multiplicand input of AND circuits that generate partial products (Field I) that are not required for generating the value of the less significant product places is set to 0. The multiplicand input of AND circuits that generate partial products (Field II) that are not required for generating the value of the more significant product places is set to 0 given multiplication of numbers without an operational sign.

For multiplication of binary numbers in two's complement representation, the multiplicand input of AND circuits that generate partial products (Field I) not required for generating the value of the less significant product places is set to zero. The multiplicand input of AND circuits that generate partial products (Field II) that are not required for generating the value of the more significant product places is connected to the most significant bit of the multiplicand. The multiplicand bits to be operated on with the operational sign bit of the multiplier factor are connected to the allocated AND circuits. The most significant bit of the multiplier factor is then added at the products place where at the most significant bit of the multiplier factor is operated on with the least significant bit ($A_0$) of the multiplicand.

For test purposes and given a multiplication of binary numbers of two's complement representation, the plurality of multiplicand bits is doubled. The additional partial products (Field II) formed as a result thereof are formed of the most significant bit of the multiplicand and of the multiplier factor bits. The plurality of multiplier factor bits is always expanded to a number divisible by four, whereby the most significant bit of the expansion is zero in the operating case and is variable in the test case, the less significant bits of the expansion in the operating case equal to the most significant bit ($B_{n-1}$) being individually adjustable in the test case. The AND elements of AND circuits that generate partial products in the Field I are connected to the least significant bit ($A_0$) of the multiplicand in the test case. Also, those AND elements of AND circuits that form partial products with inverted multiplicand are supplied with these multiplicands non-inverted in the test case.

An AND circuit having the following AND elements is contained in the last row of AND circuits: one AND element via which the allocated multiplicand bit is supplied inverted in the operating case but to which this multiplicand bit is supplied non-inverted in the test case; one AND element to which the most significant bit ($B_1$) of the multiplier factor expansion is conducted and at whose output a multiplier is arranged that through-connects either the output signal of the AND element in the test case or, in the operating case, the most significant bit ($B_{n-1}$) of the multiplier factor further AND elements that form either partial products of the allocated multiplicand bits or multiplier factor bits or the expansion thereof. In the test case, the carry inputs of the adder circuits all coated to the least significant product place ($P_0$) are connected to one another in the following way: the carry input of the second full adder of an adder circuit of the first stage is connected to the carry output of the first full adder of this stage; and the carry inputs of the first full adder of the second stage are connected to the carry outputs of the second full adder of the adder circuits of the first sage, etc., so that the carries successively run through the individual adder circuits of successive stages.

The multiplier of the invention is distinguished by high processing speed that is only logarithmically dependent on the multiplier factor word width. It can be completely tested with a low number of test patterns. The multiplier is realizable in the multiplier factor word width, for example in steps of 4 bits, in steps of 1 bit in the multiplicand word width. The layout is extremely regular and can be produced by a program. The multiplier can multiply both positive binary numbers as well as binary numbers in two's complement representation. The regular structure of the multiplier of identically constructed cells per product place also facilitates the production of multipliers that operate multiplicands and multiplier factors having different word width.

BRIEF DESCRIPTION OF THE DRAWINGS

The invention shall be set forth in greater detail with reference to exemplary embodiments that are shown in the figures. Shown are:

FIG. 2 a corresponding matrix for the multiplication in two's complement;

FIG. 3 a matrix for the multiplication in two's complement wherein multiplier factor and multiplicand have been expanded for test purposes;

FIG. 6 the arrangement of the cells given the multiplication in two's complement representation;

DESCRIPTION OF THE PREFERRED EMBODIMENT

Figure 1:
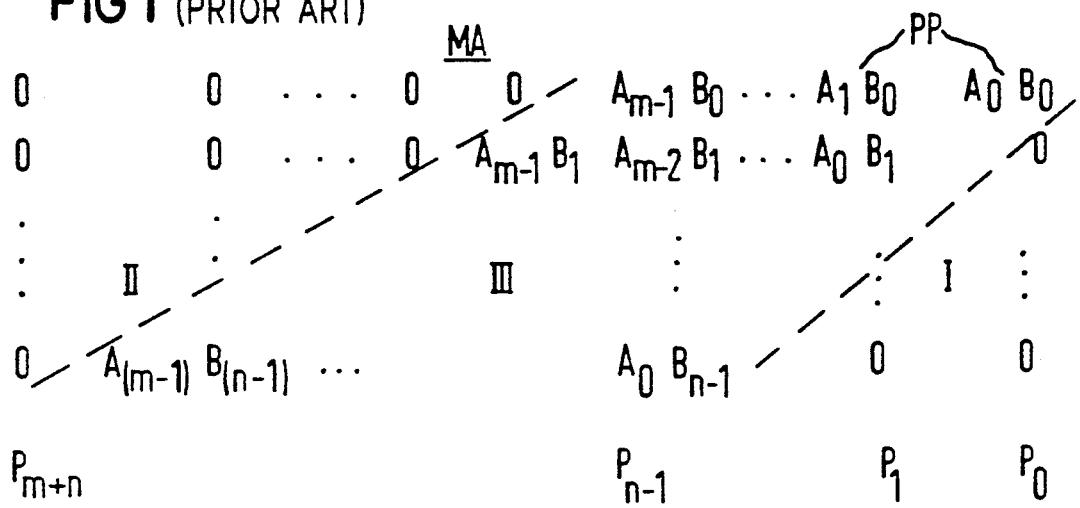
FIG. 1 a partial product matrix.

FIG. 1 shows a matrix of partial products that arise given the multiplication of positive numbers. The partial products required for forming the product are thereby arranged in Field III For reasons of regularity, the Field I and the Field II are additionally shown, the partial products being respectively 0 therein. These regions are not required for forming the values of the product places P. A m-place multiplicand A is multiplied in FIG. 1 by an n-place multiplier factor B.

When a multiplication is to be implemented with binary numbers that contain operational signs, then it is expedient to employ two's complement representation therefor. FIG. 2 shows a matrix corresponding to FIG. 1. This recites the multiplication of the multiplicand $A_0$ through $A_3$ by the multiplier factor $B_0$ through $B_3$. The Field III in which the partial products that are necessary for the multiplication are recited is shown first. It is thereby striking that the multiplicand bits are employed inverted in the penultimate row of the matrix wherein the most significant bit $B_3$ of the multiplier factor that represents the operational sign is operated with the corresponding multiplicand bits. Due to the two's complement representation, the most significant bit $B_3$ must also be additionally added in the product place $P_3$ in which the operation result of the least significant bit (LSB) of the multiplicand $A_0$ with the most significant bit (MSB) $B_3$ of the multiplier factor ensues. Field I in FIG. 2 corresponds to that in FIG. 1. It is thus filled with zeros, whereas the Field II in FIG. 2 is treated differently than in FIG. 1. Partial products wherein the most significant bit $A_3$ of the multiplicand is respectively operated with allocated places of the multiplier factor $B_0$ through $B_2$ reside here. The product places $P_0$ through $P_6$ then arise at the lower edge of the matrix. A further product place $P_7$ for a potential carry can also be provided.

For reasons of regularity, it is meaningful that the partial products lying in Field I and Field II are also generated. Partial products respectively allocated to the individual product places P are then obtained, these lying in the columns of FIG. 2. An identical number of partial products is present in every column; correspondingly, an identical number of circuits for generating the partial product per column must be provided.

The multiplicand A has already been expanded in FIG. 2, namely by three places. The most significant bit $A_3$ of the multiplicand is respectively utilized for the multiplicand places $A_4$, $A_5$, $A_6$. A corresponding expansion of the multiplier factor is meaningful for test purposes. FIG. 3 shows a matrix for such a case. The expansion of the multiplier factor ensues such that the size of the expanded multiplier factor B is divisible by 4. Four places would then have to be added in a matrix corresponding to FIG. 2. The expanded multiplier factor bits $B_4$, $B_5$, $B_6$ are thereby set equal to the most significant bit $B_3$ of the multiplier factor; in the operating case, by contrast, the expanded multiplier factor bit $B_7$ is set to 0. This expansion has no influence in the operating case since the multiplier factor is correctly represented in two's complement. In the test mode that shall be set forth later, however, each expanded multiplier factor bit $B_4$ through $B_7$ can be individually driven and an individual check of the individual circuits employed for the formation of the partial products can thus be implemented.

How the multiplier is constructed shall be set forth below. This thereby proceeds on the basis of the matrix of FIG. 3 as a rule.

Figure 4:
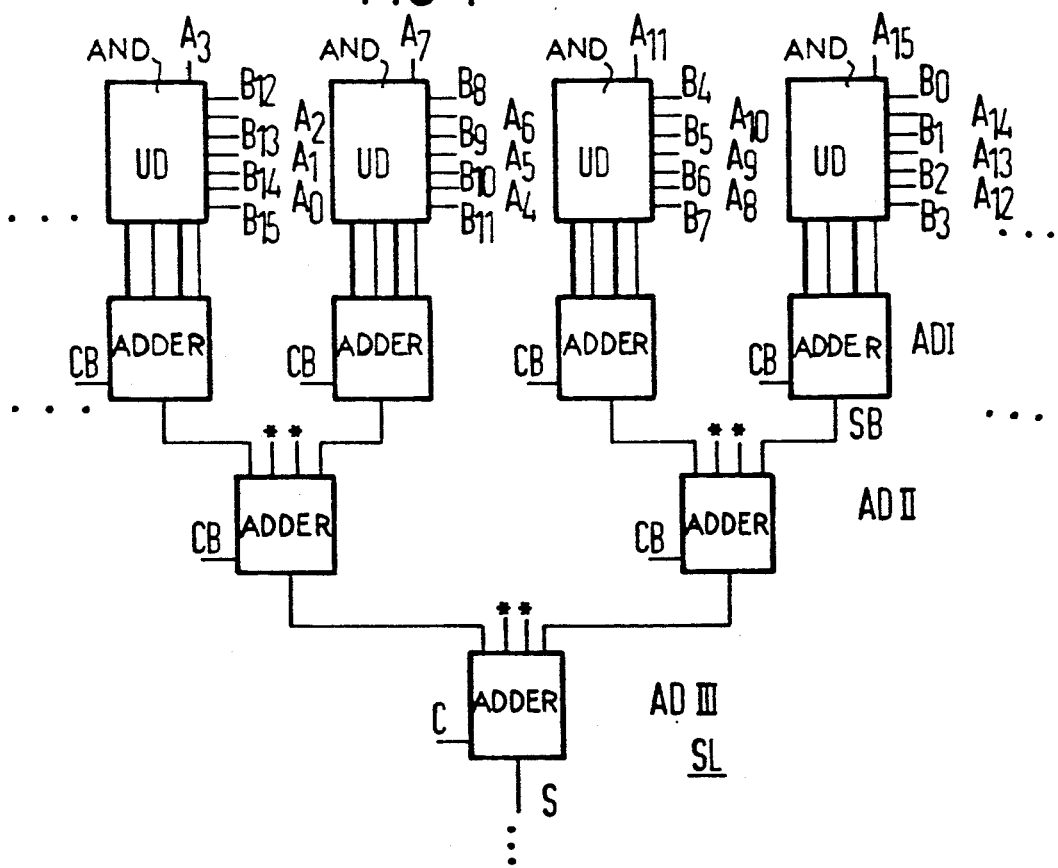
FIG. 4 a circuit diagram that shows the interconnection of AND circuits and adder circuits per product place, FIG. 5 a schematic illustration of the arrangement of the cells given the multiplication of positive numbers.

FIG. 4 yields the principle of a circuit with which the value is calculated for a product place P. This means that a circuit of FIG. 4 is allocated to a column of the matrix. In the example of FIG. 4, a multiplicand and a multiplier factor having a word width of 16 bits are operated with one another. The generation of the partial products ensues with the assistance of AND circuits UD, whereby each AND circuit UD contains four AND elements whereof each AND element forms a respective partial product. In accord therewith, each AND circuit UD outputs four partial products at the output, these being respectively summed up in an adder circuit. The adder circuit AD must thus be constructed such that it can sum up four bits. A corresponding circuit derives from FIG. 15. This means that the adder circuit AD turns four input signals into two output signals, a sum bit SB and a carry bit CB.

Every AND circuit UD thus has an adder circuit allocated to it that shall be referred to as adder circuits of Stage 1. These adder circuits are referenced ADI. When a plurality of adder circuits ADI are present, their output values, the sum bit SB, must be summed-up further. This ensues with the assistance of adder circuits of Stage 2 that are referenced ADII. In FIG. 4, yet a further adder circuit, namely one of Stage 3, is required, this being referenced ADIII and the values S (sum bit) and C (carry bit) for the product place being then output at its output. The adder circuits AD are all identically constructed, i.e. they operate four input signals to form two output signals, a sum bit and a carry bit. The carries CB that are generated by the adder circuits ADI and ADID of this product place proceed to adder circuits of the next-higher product place. The carries that are required for the addition of this place are supplied by the adder circuits of the next-lower product place. These carries are referenced with asterisks in FIG. 4.

As derives from FIG. 4, a circuit arranged tree-like arises for the realization of the value of a product place, this circuit being respectively based on AND circuits UD and becoming narrower and narrower with the assistance of adder circuits AD until only one adder circuit of the highest stage required is still present.

The number of adder stages is dependent on the size of the multiplier factor and is also dependent on whether the multiplication of two positive numbers or of two numbers in two's complement is to be carried out. For a multiplier that multiplies only positive numbers, the number of adder stages is established by the binary logarithm $\log_2 n$ (n is the number of bits of the multiplier factor) rounded up to the next, whole number and then de-incremented by 1). For a multiplier for two's complement numbers, the number of adder stages corresponds to $\log$, $(n+1)$ rounded up to the next, whole number and de-incremented by 1.

The arrangement of the individual cells that each respectively contain a circuit according to FIG. 4 on a semiconductor module is schematically shown in FIG. 5 for that case that numbers free of operational signs are multiplied with one another. Individual cells SL lie side-by-side and form a multiplier field MF. The partial products are formed in the cells SL and added up per product place. The result appears as sum bit S and carry bit C at the output of every cell SL. The sum bit at the output of the cell SL must still be operated with the carry of the preceding product place. This ensues in the adder circuit ADD to which the value S of the individual cells and a carry C of a preceding cell is supplied. The correct value P of the corresponding product place then appears at the output of the adder circuit ADD. This value P is written into an output register AG. The multiplicand A is written into the input register RE1 and is supplied to the cells SL from there. As shown in FIG. 3, the most significant bit Am attached to the multiplicand is supplied to the cells that generate the partial products of the Field II. Since these are always 0 in the case of FIG. 5, the most significant bit must be set to 0. The multiplier factor B is supplied to an input register RE 2 and proceeds to the individual cells SL of the multiplier via an additional circuit TE that serves the purpose of testing. The register RE2 also contains places for a test signal TN1 and for an initial carry CIN.

FIG. 6 shows the fundamental structure of a multiplier that multiplies binary numbers represented in two's complement. It differs from the multiplier of FIG. 5 in that, first, the most significant bit of the multiplicand A that represents the operational sign is supplied to the cells SL that must generate the partial products in the Field II. A further difference is comprised therein that the register RE2 for the multiplier factor provides a place for a second test signal TM2. The execution of the register RE1 may be taken from FIG. 16, the execution of the register RE2 may be taken from FIG. 18 and the execution of the test circuit TE may be taken from FIGS. 17 and 19.

Figure 7:
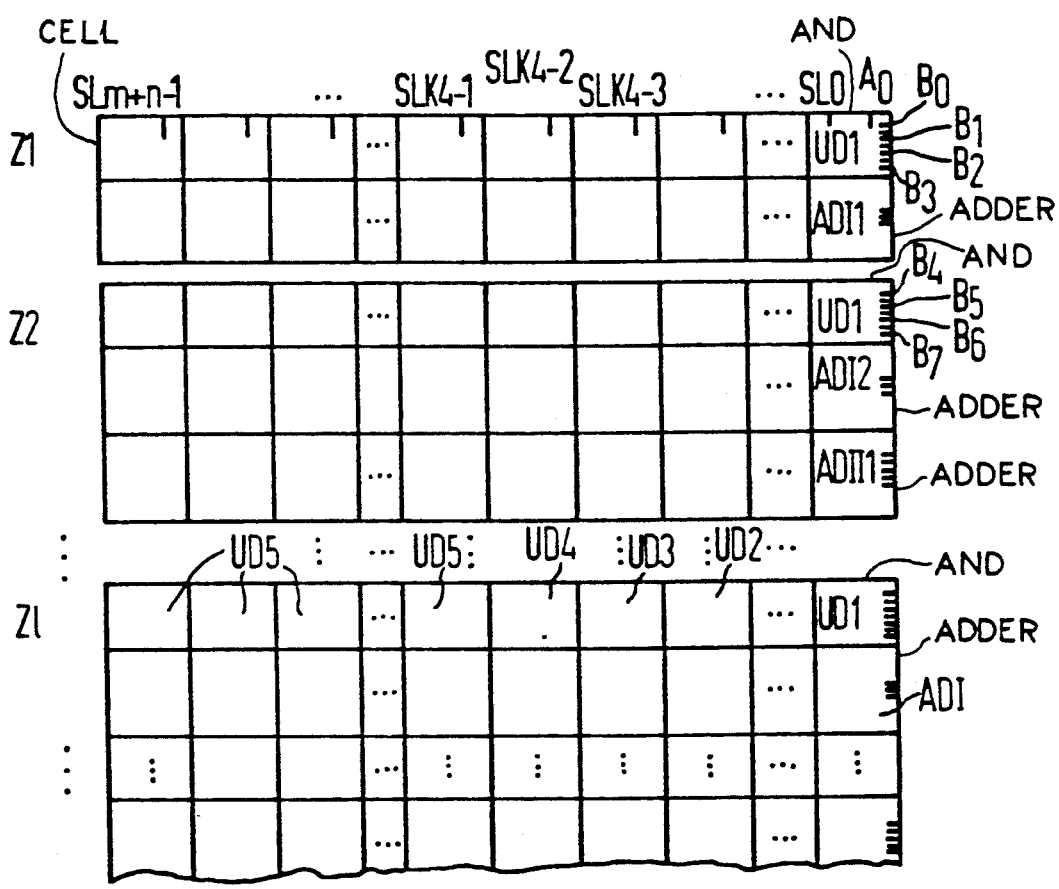
FIG. 7 the succession of AND circuits and adder circuits within the cells.

The more detailed arrangement of the AND circuits and adder circuits that are shown in FIG. 4 in the cell SL derives from FIG. 7. The individual cells SL of the multiplier field MF are arranged in the chip in the fashion to be derived from FIG. 7. Let the cell SL0 that generates the least significant product place of FIG. 3 be explained as an example. From top to bottom, an AND circuit UD1 is first arranged in the first row Z1, followed by an adder circuit of the first stage ADI1. The AND circuit UD1 is supplied with four lines for four bits $B_0$ through $B_3$ of the multiplier factor and with one bit $A_0$ of the multiplicand. As FIG. 3 shows, the partial product $A_0B_0$ required for generating the product place $P_0$ can thus be generated. The other lines indicated at the AND circuit UD1 in the cell SL0 serve the purpose of checking the multiplier field and generate the Field I. The adder circuit ADI1 of the first stage that follows the AND circuit UD1 operates the partial products of the AND circuit UD1. The lines indicated at the edge are required for testing the multiplier field MF. They derive from FIG. 19.

The adder circuit ADII is followed by an AND circuit UD1 of the second row Z2 that carries out the operation of the multiplicand bits with the multiplier factor bits $B_4$ through $B_6$. In terms of structure, it corresponds to the AND circuit UD1 of the first row Z1. The AND circuit UD1 of the second row Z2 is followed by an adder circuit ADI2 of the first stage that operates the partial products of the AND circuit UD1. The adder circuit ADI2 is followed by an adder circuit of the second stage that is referenced ADII1. The output signals of the two adder circuits of the first stage, namely ADI1 and ADI2, are summed up with this adder circuit of the second stage.

A wiring channel wherein the lines on which the multiplicand bits are transmitted respectively offset by one row can be provided between the rows Z1 and Z2. The offset corresponds to the matrix, for example FIG. 3.

The row Z2 can be followed by further rows that are correspondingly constructed. They are always composed of a series of AND circuits UD1 that is followed by at least one adder circuit of the first adder stage AD1.

Figure 8:
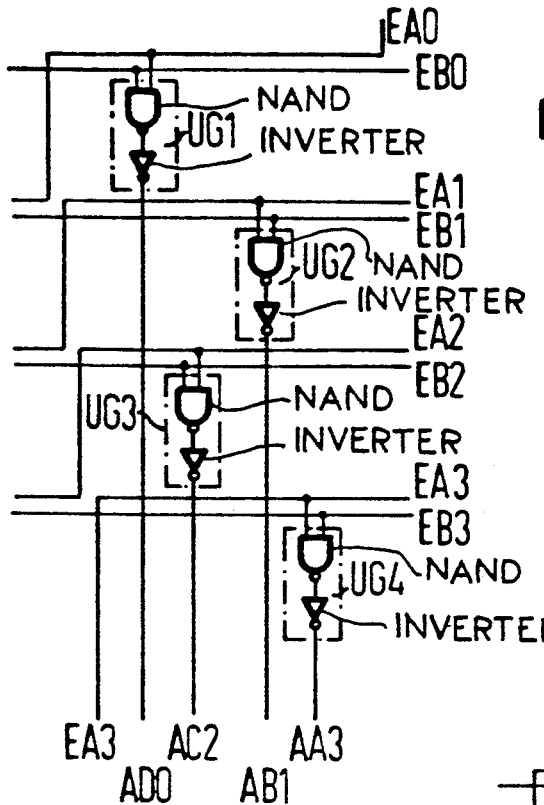
FIG. 8 through FIG. 12 AND circuits that are employed for operating the partial products.

The structure of the AND circuits UD1 can be derived from FIG. 8. The AND circuit is composed of four AND elements UG1 through UG4 that are realized here as NAND elements having connected inverter. Via the terminal EA0, the first AND element UG1 is supplied with the most significant multiplicand bit of the four multiplicand bits to be operated here and, via the input EB0, is supplied with the least significant multiplier factor bit of the multiplier factor bits to be operated. The second most significant multiplicand bit is supplied to the second AND element UG2 via the input EA1 and the second least significant multiplier factor bit is supplied thereto via the input EB1, etc., until the AND element UG4 is supplied with the least significant multiplicand bit at the input EA3 and with the most significant multiplier factor bit at the input EB3. It may also be seen from FIG. 8 how the lines for the multiplicand bit are conducted offset to the neighboring cell, whereas the lines for the multiplier factor bits are conducted horizontally through the AND circuit.

For the last four multiplier factor bits to be operated, i.e. the most significant multiplier bits or, according to FIG. 3, the multiplier bits of the last four rows of the matrix, a row $Z_1$ is provided according to FIG. 7 that contains AND circuits in the first array and adder circuits of various stages in the following rows. Corresponding to the above-recited equation, the number of adder stages depends on the width of the multiplier factor to be operated.

Figure 9:
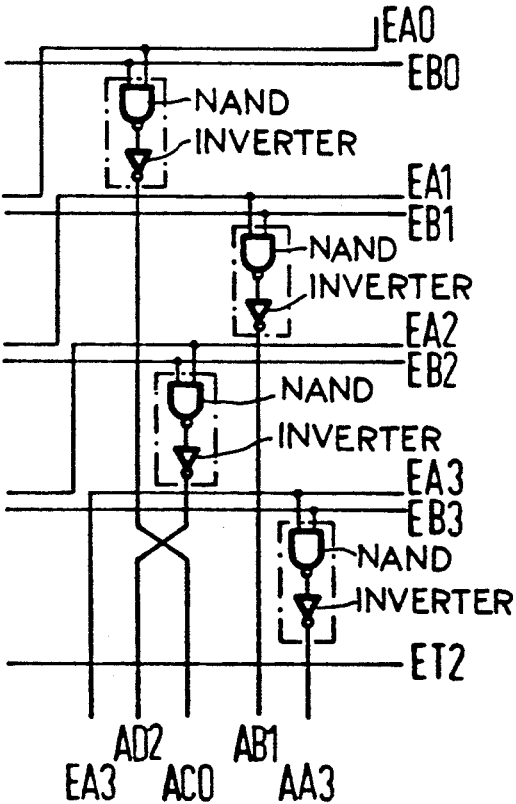
Figure 10:
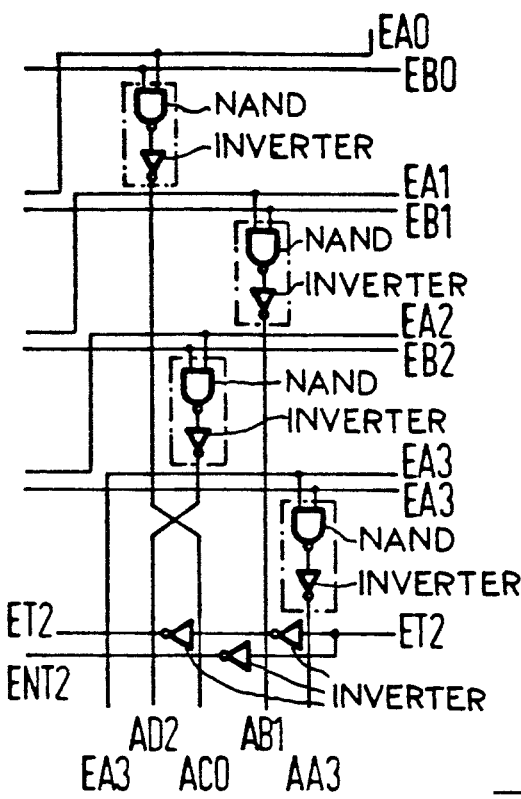

The execution of the AND circuits in the array of the row $Z_1$ is different and depends on what partial products are to be formed. A comparison to FIG. 3 shows that somewhat different AND circuits for forming the partial product are needed in the last four rows of the matrix that cover the multiplier factor bits $B_4$ through $B_7$. Correspondingly, there are different AND circuits. AND circuits UD2 are employed from cell SL0 up to and including cell $4k-3$, whereby $k=(n \text{ div } 4)+1$ applies (div is the integer division without remainder). With reference to the matrix of FIG. 3, $n=4$ applies and a value of 2 thus derives for k. What this means is that an AND circuit UD2 is employed up to cell 5. This can also be easily accomplished according to FIG. 3. The structure of this AND circuit UD2 derives from FIG. 9. It may be seen that this AND circuit UD2 hardly differs from the AND circuit UD1. The significant difference may be seen therein that a line for a test signal ET2 passes through the AND circuit UD2. The job of the test signal ET2 shall be explained later.

The next AND circuit in the array, namely the AND circuit UD3 that affects the sixth cell in the example of FIG. 3 is likewise nearly identical to the AND circuit UD2; it differs only in that the line for the test signal ET2 splits into two lines, namely a line for forwarding the test signal ET2 in inverted form ENT2 and in non-inverted form ET2.

Figure 11:
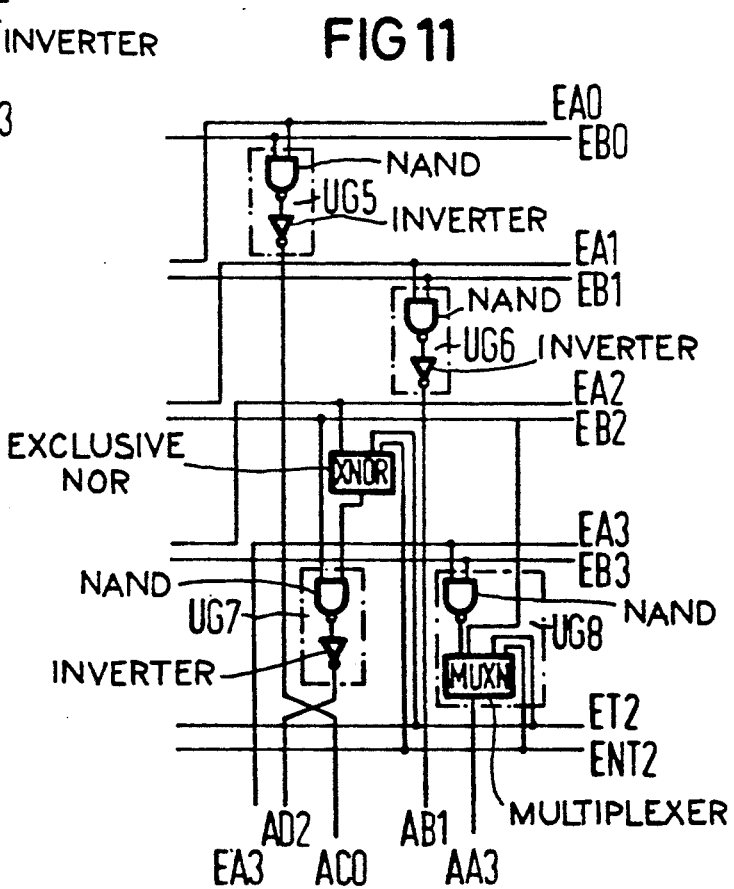

A modification of the AND circuit derives with the AND circuit UD4 that affects the cell $4k-1$, i.e. the seventh cell SL7 of FIG. 3. It may be seen from FIG. 3 that this AND circuit—by comparison to the other AND circuits—must operate a multiplicand bit inverted with the multiplier factor bit in an AND element and must also additionally through-connect the most significant bit $B_3$ of the multiplier factor to the output of the AND circuit in an AND element. An execution of this AND circuit UD4 derives from FIG. 11. Whereas two AND elements UG5 and UG6 have not experienced any modification, the AND elements UG7 and UG8 are somewhat differently constructed. The AND element UG7 is likewise composed of an NAND element and of an invertor but an EXNOR circuit that is driven via the test signals ET2 and ENT2 is connected to the input EA2. In the operating case, this EXNOR circuit is wired such that it connects the multiplicand bit at the input EA2 inverted to the input of the NAND element of the AND element UG7. In the test case, by contrast, the EXNOR circuit is driven such via the test signals ET2 and ENT2 that the multiplicand bit at the input EA2 is through-connected to the AND element not inverted. What this means is that the AND element UG7 is treated like all other AND elements in the test case and, thus, the testing is simplified. The AND element UG8 is composed of an inverter and of a multiplexer circuit MUXN arranged at the output. The multiplexer circuit MUXN is likewise driven by the test signals ET2 and ENT2. It is wired such in the operating case that the multiplier factor bit at the input EB2 is through-connected to the output, this is the most significant bit $B_3$ in FIG. 3. In the test case, by contrast, the bit adjacent at the inputs EA3 and EB3 is through-connected via the NAND element, so that the AND element UG8 works like the other AND elements of the AND circuits in the test case.

Figure 12:
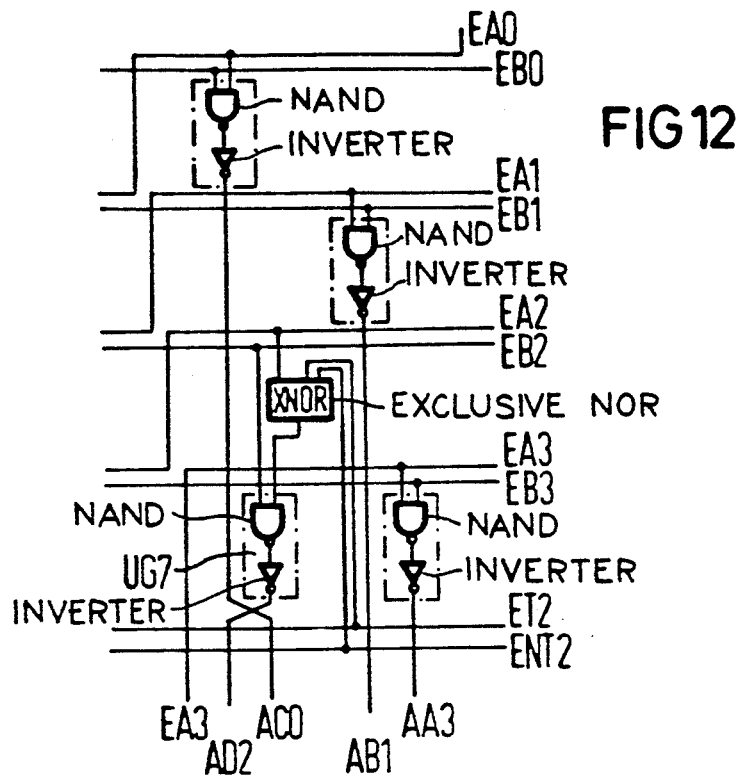

The remaining AND circuits of the row Z1 RAND circuits UD5 that are constructed according to the AND circuit UD4—except for the AND element UG8 that is not required since the most significant bit of the multiplier factor need not be through-connected to the output here. An embodiment derives from FIG. 12. It may be seen that, agreeing with the matrix in FIG. 3, the inverted multiplicand bits to be operated with the most significant bit $B_3$ of the multiplier factor are operated in the AND element UG7 and that the remaining AND elements have normal structure. The test signals ET2 and ENT2 are again provided for switching the AND element UG7 from the operating case into the test case.

Figure 13:
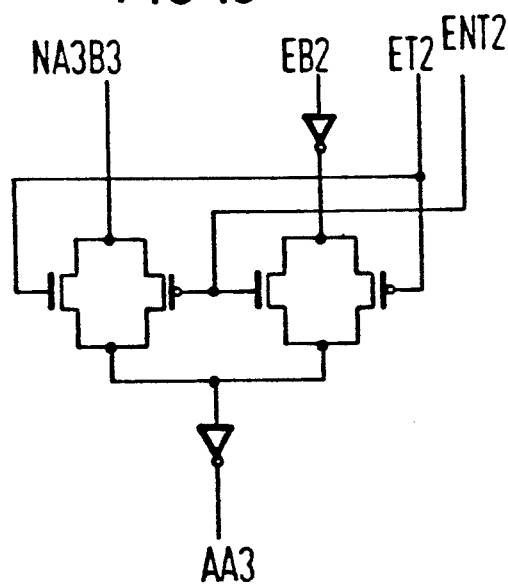
FIG. 13 the execution of an employed multiplexer.
Figure 14:
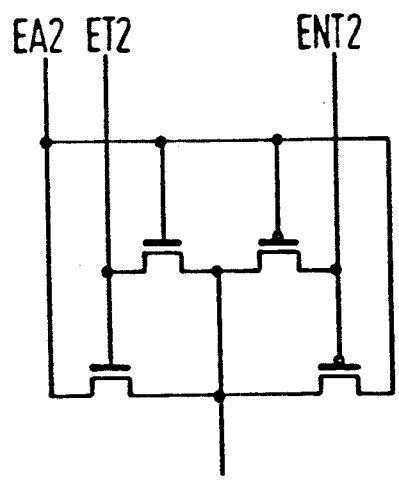
FIG. 14 the execution of an xnor circuit.

An embodiment of the EXNOR circuit derives from FIG. 14; an embodiment of the multiplexer circuit MUXN derives from FIG. 13.

Figure 15:
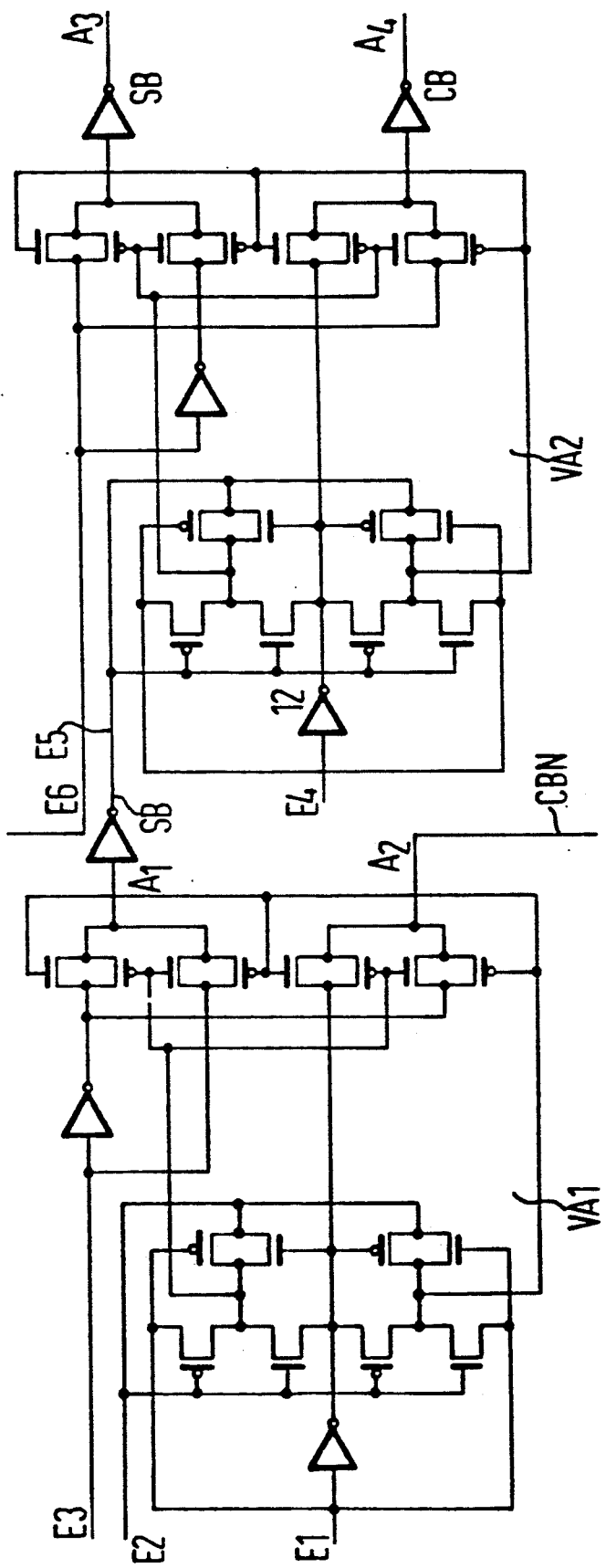
FIG. 15 the execution of the adder circuit.

An adder circuit derives from FIG. 15. It may be seen that the adder circuit is composed of two full adders, namely of the full adder VA1 and of the full adder VA2. The full adder VA1 has three inputs E1, E2, E3 and two outputs, one output for the sum bit SB and one output for the carry bit CBN that is output inverted in this case. The full adder VA2 likewise has three inputs E4, E5, E6. The input E5 is supplied with the sum bit SB of the first full adder VA1; the input E6 is supplied with an inverted carry bit from a neighboring cell. The input E4 can be supplied with either a partial product or with a carry bit dependent on the stage to which the adder circuit belongs. The full adder VA2 outputs the sum bit SB at the output A3 and the carry bit CB at the output A4.

When the adder circuit of FIG. 15 is used in the first stage, i.e. as adder circuit AD1, then a respective partial product is supplied at the input E1, E2, E3, a partial product is likewise supplied to the input E4, the sum bit is supplied to the input E5 and a carry bit is supplied to the input E6 from the first full adder of the adder circuit of the first stage of the next, less-significant cell. This can be derived from FIG. 19. Two least significant cells SL1 and SL0 are shown here. In the cell SL1, the adder circuit AD1 of the first stage—that is connected to an allocated AND circuit—has partial products supplied to it at the inputs E1 through E3, likewise has a partial product supplied to it at the input E4, has the sum bit of the first full adder supplied to it at the input E5 and has a carry bit of the first full adder of the adder circuit of the first stage arranged neighboring it supplied to it at the input E6.

The adder circuit ADII1 of the second stage of the cell SL1 is supplied with the sum bit of the adder circuit ADI2 at the input E1, with the carry bit of the adder circuit ADI2 of the cell SL0 at the input E2, with the carry bit of the adder circuit ADI1 of the cell SL0 at the input E3. The sum bit of the adder circuit ADI1 of the same cell SL1 is adjacent at the input E4; the sum bit of the allocated full adder VA1 is adjacent at the input E5; and the carry bit of the adder circuit ADII1 of the cell SL0, namely of the first full adder VA1 thereof, is adjacent at the input E6.

The adder circuits of the higher stages are then connected according to a corresponding rule. In an adder circuit of a higher stage, a sum bit and two carry bits are always operated in the first full adder and two sum bits and one carry bit are always operated in the second full adder.

A higher stage of adder circuits thus always operates the sum bit and carry bit of adder circuits of a lower stage. It can thereby derive that an adder circuit of a higher stage must operate the output signals of adder circuits of different stages. This is the case when the plurality of adder circuits per stage is not divisible by two.

It has already been stated that five different AND circuits that, however, differ only slightly are required given the two's complement representation of the binary numbers to be operated. The reason for this has been set forth in conjunction with FIG. 3. Only one AND circuit UD1 is required when only positive numbers without operational sign bit are to be operated with one another.

In order to be able to test the multiplier, namely the multiplier field MF, prescribed bit patterns must be supplied to the AND circuits UD and to the adder circuits AD and the output signals output by the cells at the outputs of every cell SL must be compared to rated signals. The comparison then shows whether a cell works faultlessly or not. The testing of the cells requires comparatively simple bit patterns at the input when the cells SL can all be operated in the same way. In order to achieve this, a test circuit TE and test signals TM are respectively provided in FIGS. 5 and 6. The structure of the test circuit TE and the function of the test signals TM1 in FIG. 5 or, respectively, TM1 and TM2 in FIG. 6 shall now be set forth in conjunction with the circuits of FIGS. 15 through 18 and the above-explained AND circuits.

Figure 16:
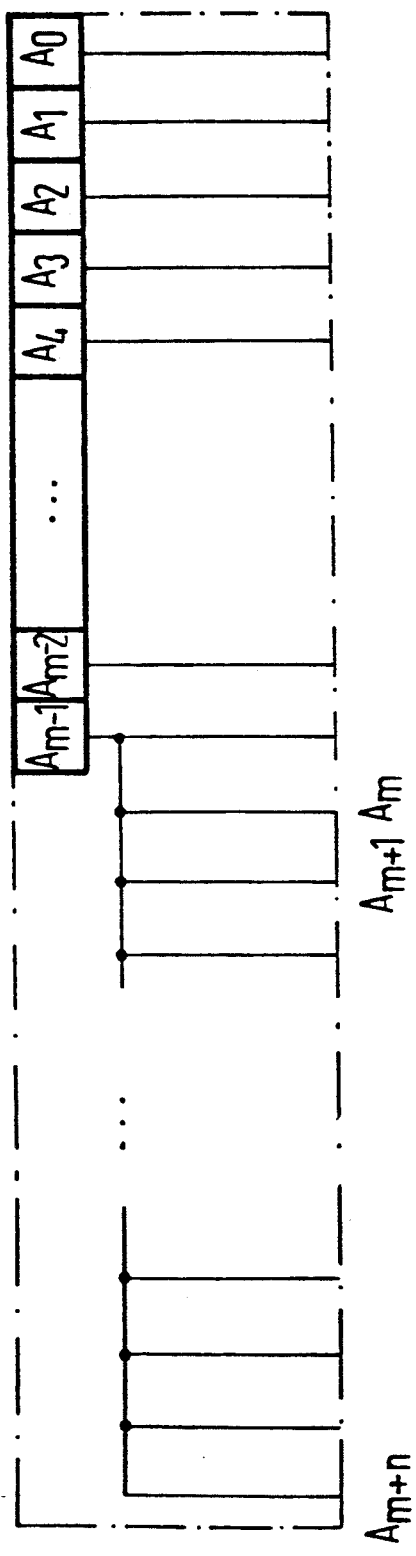
FIG. 16 a schematic illustration from which how the multiplicand bits are supplied to the multiplier follows.

According to FIG. 6, the multiplicand bit A is supplied such to the AND circuits in the Field III that a respective multiplicand bit is supplied to one cell and this multiplicand bit is then forwarded offset to the neighboring cell. The multiplicand bits in the Field II all correspond to the most significant bit of the multiplicand and are thus supplied to every cell that is more significant than the most significant bit of the multiplicand. FIG. 16 shows a circuit via which this can be carried out. The multiplicand bits $A_0$ through $A_{n-1}$ are respectively supplied to a cell $ZL_0$ through $ZL_{m-1}$. The most significant multiplicand bit $A_{m-1}$ is then supplied to the remaining cells, namely to the cells $Z1L_m - ZL_{m+l-1}$.

Figure 17:
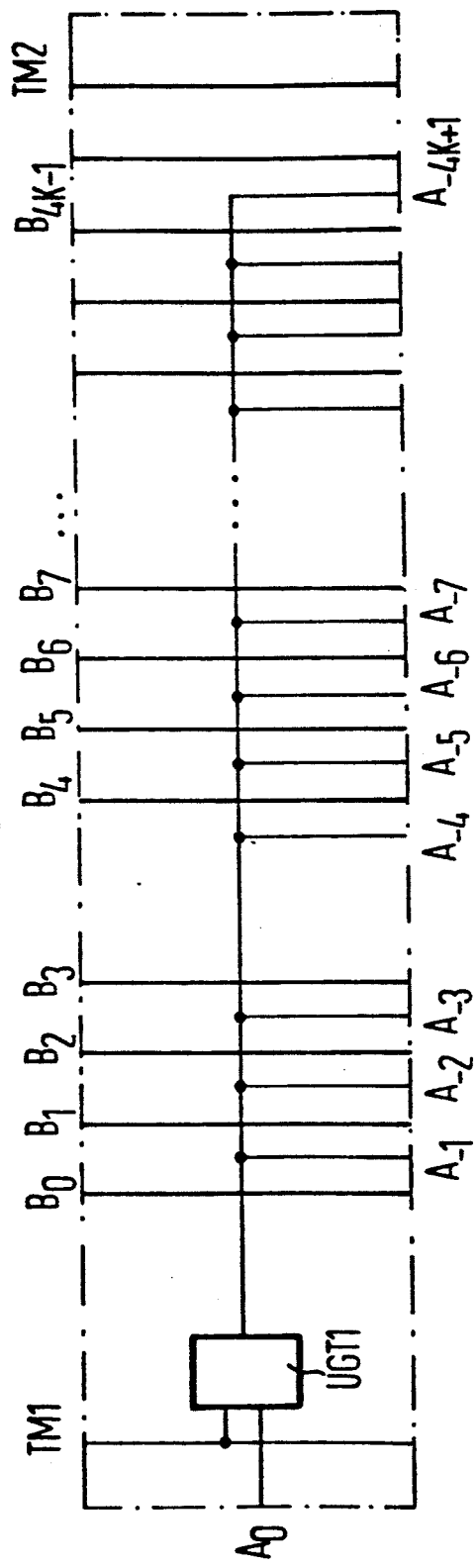
FIG. 17 a schematic illustration from which how the multiplier factor bits for the AND circuits in Field I are supplied follows.

The AND circuits in the Field I that receive a 0 at their inputs for the multiplicand in the operating case must be driven with a specific multiplicand bit in the test case. This is the multiplicand bit $A_0$ in the exemplary embodiment. A circuit according to FIG. 17 is provided in order to achieve this. The multiplicand bit $A_0$ is conducted via an AND element UGT1 to the AND elements UG of the AND circuits that generate the partial products in the Field I. The test signal TM1 is also adjacent at the AND element UGT1. Dependent on what value the test signal TM1 has, the output signal of the AND element UGT1 is 0 or $A_0$. The expansion of the multiplier factor according to FIG. 3 leads thereto that $l = 4k - 1$ AND elements must driven. In the exemplary embodiment of FIG. 3, 1 would be equal to 7.

Since $A_0$ is supplied to the AND elements in the Field I in the test case and since the multiplier bits are independently adjustable, the AND elements can be tested with various values.

Figure 18:
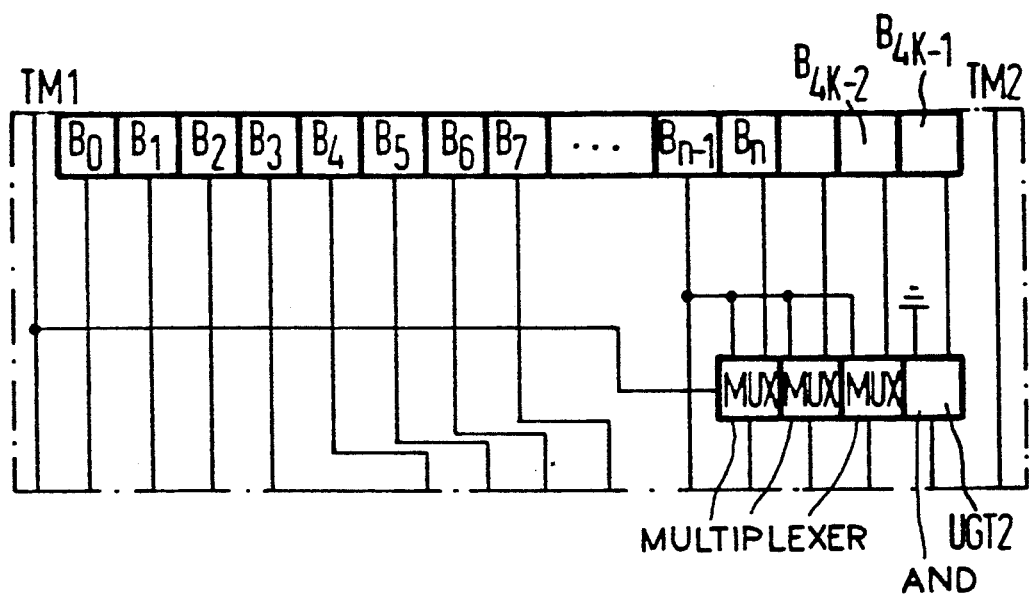
FIG. 18 a schematic illustration regarding the supply of the multiplier factor bits.

The explanation of FIG. 7 has shown that AND elements UD2 through UD5 are used in the row Z1. The operating case has thereby been explained there. In the operating case, the most significant bits of the multiplier factor, for example the multiplier factor bit $B_3$ in FIG. 3, are supplied to the AND elements in the operating case, except to one AND element. FIG. 18 shows a circuit with which this is achieved. The multiplier factor bits $B_{n-1}$ through $B_{4k-2}$ are through-connected to the AND elements via multiplexer MUX dependent on the test signal TM1. In the test case, by contrast, these AND elements must be capable of being individually set with their multiplier factor inputs. The test signal TM1 is again utilized for this purpose, this switching the multiplexer MUX such that the expanded multiplier factor bits $B_n$ through $B_{4k-1}$ are connected to the AND elements. The expanded multiplier factor bit $B_{4k-1}$ is conducted via an AND element UGT2 that is driven by the test signal TM1 to an AND element, namely to the AND element for the row within the matrix in which the most significant bit of the multiplier factor is added to the partial products of a column, i.e. to the last row of the matrix in FIG. 3. Dependent on the value of the test signal TM1, a 0 or the multiplier factor bit $B_{4k-1}$ appears at the output of the AND element UGT2. In the operating case, a 0 is output at the output of the AND element UGT2; in the test case, the multiplier factor bit $B_{4k-1}$ is output thereat. It is thus possible to individually test the allocated AND elements.

Figure 19:
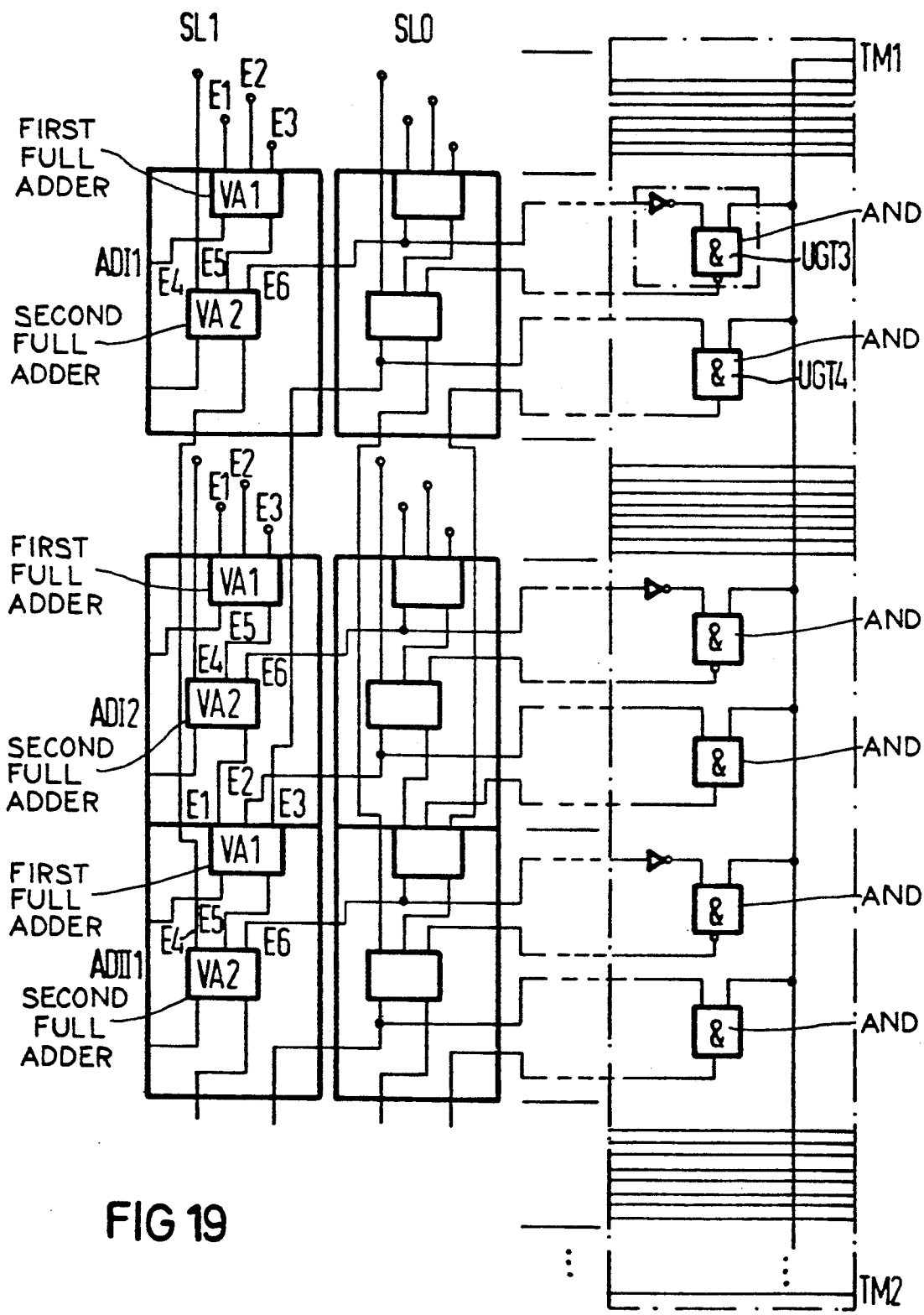
FIG. 19 a circuit diagram from which how the carry inputs of the adder circuits of the least significant cell are connected in the test case follows.

It must also be seen to in the test case that the carry inputs of the adder circuits of the cell SL0 are supplied with the same carry as the cell SL1. The carry inputs of the adder circuits of the remaining cells are connected in the usual way. In order to achieve this, the carry output of the first full adder of the adder circuit of the first stage ADII according to FIG. 19 is conducted via an AND element UGT3 to the carry input of the second full adder of the same adder circuit. The carry output of the adder circuit ADII of the first stage is then connected via a further AND element UGT4 to the carry input of the next adder circuit ADII1 of the second stage. The analogous case also applies to the other adder circuits. For example, the adder circuit ADI2 of the second row has its carry output connected to the carry input of the adder circuit ADII1 of the second stage, etc. The interconnection can be derived from FIG. 19. With the assistance of the test signal TM1 that is connected to the AND elements UGT3 and UGT4, either the carry signal from a full adder of this or of a preceding stage or the value 0 can be applied to the carry inputs. It is thus achieved that the carry signal that is evaluated in the first cell SL0 is 0 in the operating case but a defined carry proceeds to the adder circuits of the first cell SL0 in the test mode. It is thus possible that the application of test signals makes it possible to generate defined output signals that can be checked for their correctness. The outlay required for this purpose is low.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A multiplier for performing an operation on an m-digit multiplicand and an n-digit multiplier factor that are both represented as binary numbers, comprising:

m+n cells arranged side-by-side, respectively one per product place, whereof each cell respectively contains AND circuits for forming partial products allocated to the product digit and adder circuits for summing up the partial products for this product digit;

each cell of the m+n cells having, a first stage having a respective adder circuit for each AND circuit, each adder circuit operating on a partial product formed by a respective AND circuit to form a partial sum and a partial carry;

a second stage having a plurality of adder circuits, each adder circuit of the second stage operating on at least two partial sums formed by respective adder circuits of the first stage and at least two partial carries of a next-less significant product digit of the first stage to form a further partial sum and a further partial carry;

a third stage having a plurality of adder circuits, each adder circuit of the third stage operating on at least two partial sums formed by respective adder circuits of the second stage and at least two partial carries of a next-less significant product digit of a second stage to form another further partial sum and another further partial carry;

an ith stage having a plurality of adder circuits, each adder circuit of the ith stage operating on at least two partial sums formed by respective adder circuits of a (i−1)th stage and at least two partial carries of a next-less significant product digit of a (i−1)th stage to form an additional further partial sum and an additional further partial carry;

a final adder circuit that operates on the final sum formed by respective adder circuits of the ith stage and two partial carries of a next-less significant product digit of an ith stage to form a final sum and a final carry; and a further added circuit that operates on the final sum formed by the final adder circuit and a final carry of a next-less significant product digit to form a value for the product digit of the respective cell;

for each cell of the m+n cells, a first sequence defined by, a first AND circuit of the first stage being followed by a first adder circuit of the first stage, the first adder circuit of the first stage being followed by a second AND circuit of the first stage, the second AND circuit of the first stage being followed by a second adder circuit of the first stage, the second AND circuit of the first stage being followed by a first adder circuit of the second stage that receives signals from the first and second adder circuits of the first stage, a second sequence defined by, a series of first sequences that ends with a last adder circuit of the second stage, the last adder circuit of the second stage being followed by a first adder circuit of the third stage that receives signals from the adder circuits of the second stage, and a jth sequence defined by a series of j−1 sequences, a last element in the jth sequence being said final adder circuit.

2. The multiplier according to claim 1, wherein each adder circuit is composed of first and second full adders connected in series, each of which has respectively three inputs.

3. The multiplier according to claim 2, wherein every AND circuit is composed of four AND elements whereof each operates on one bit of the multiplicand and one bit of the multiplier factor.

4. The multiplier according to claim 3, wherein an adder circuit is connected in the following way:

three partial products are received at first, second and third inputs of the first full adder;

a fourth partial product is received at a first input of the second full adder, a sum bit of the first full adder is received at a second input of the second full adder, a carry bit from the first full adder of the adder circuit of the first stage allocated to the next-less significant product digit is received at a third input of the second full adder.

5. The multiplier according to claim 4, wherein an adder circuit of a more significant stage is connected in the following way:

a sum bit from an adder circuit of a less significant stage is received at a first input of the first full adder, a respective carry bit from carry outputs of adder circuits of a lower stage allocated to a next-less significant product digit is received at second and third inputs of the first full adder;

a sum bit of an adder circuit of a less-significant stage is received at a first input of the second full adder, a sum bit from the first full adder of the same stage is received at a second input of the second full adder and a carry bit from a first full adder of an adder circuit of the same stage allocated to a next-less significant product digit place is received at a third input of the second full adder.

6. The multiplier according to claim 1, wherein all cells comprise an identical plurality of AND circuits and an identical plurality of adder circuits; wherein a multiplicand input of AND circuits that generate partial products, in a Field I, that are nit required for generating a value of less significant product digits is set to 0; and wherein a multiplicand input of AND circuits that generate partial products, in a Field II, that are not required for generating the value of more significant product digits is set to 0 given multiplication of numbers without an operational sign.

7. The multiplier according to claim 1, wherein all cells comprise an identical plurality of AND circuits and an identical plurality of adder circuits; wherein, for multiplication of binary numbers in two's complement representation, a multiplicand input of AND circuits that generate partial products, in a Field I, not required for generating a value of less significant product digits is set to 0; wherein a multiplicand input of AND circuits that generate partial products, in a Field II, that are not required for generating a value of more significant product digits is connected to a most significant bit of the multiplicand; wherein bits of the multiplicand to be operated on with an operational sign bit of the multiplier factor are applied to the allocated AND circuits; and wherein a most significant bit of the multiplier factor is added at the product digit where at a most significant bit of the multiplier factor is operated on with a least significant bit of the multiplicand.

8. The multiplier according to claim 7, wherein for a test case given a multiplication of binary numbers of two's complement representation, a plurality of bits is doubled; wherein the partial products, in the Field II, arising as a result thereof are formed of a most significant bit of the multiplicand and of bits of the multiplier factor; wherein a plurality of multiplier factor bits of the multiplier factor is always expanded to a number divisible by four, whereby a most significant bit of the expansion is 0 in an operating case and is variable in the test case, less significant bits of expansion in the operating case equal to a most significant bit of the multiplier factor being individually adjustable in the test case.

9. The multiplier according to claim 8, wherein AND elements of AND circuits that generate partial products in the Field I are connected to a least a significant bit of the multiplicand in the test case.

10. The multiplier according to claim 9, wherein AND elements of AND circuits that form partial products with inverted multiplicands are supplied with multiplicands non-inverted in the test case.

11. The multiplier according to claim 8, wherein an AND circuit having the following AND elements is contained in a last row of AND circuits;
one AND element via which an allocated bit of the multiplicand is supplied inverted in the operating case but to which this bit of the multiplicand is supplied non-inverted in the test case;
one AND element to which the most significant bit of the multiplier factor expansion is conducted and at whose output a multiplexer is arranged that through-connects either an output signal of the AND element in the test case or, in the operating case, the most significant bit of the multiplier factor;
further AND elements that form either partial products of the allocated bits of the multiplicand or bits of the multiplier factor or the expansion thereof.

12. The multiplier according to claim 8, wherein in the test case, carry inputs of the adder circuits allocated to a least significant product digit are connected to one another in the following way:
a carry input of the second full adder of an adder circuit of the first stage is connected to a carry output of the first full adder of this stage;
carry inputs of the first full adder of the second stage are connected to carry outputs of the second full adder of the adder circuits of the first stage, and carry inputs of the first full adder of an ith stage are connected to carry outputs of the second full adder of an (i−1)th stage, so that the carriers successively run through the individual adder circuits of successive stages.

* * * * *